(12) United States Patent
Song et al.

(10) Patent No.: US 11,975,322 B2
(45) Date of Patent: May 7, 2024

(54) OPTICAL POSITIONING CODE DISK, DEVICE AND METHOD FOR MICROFLUIDIC CHIP

(71) Applicant: CAPITALBIO TECHNOLOGY (CHENGDU) CO., LTD., Sichuan (CN)

(72) Inventors: Chicheng Song, Sichuan (CN); Guanbin Zhang, Sichuan (CN); Yong Huang, Sichuan (CN); Yong Tao, Sichuan (CN); Ruoran Li, Sichuan (CN); Hongcheng Zhou, Sichuan (CN)

(73) Assignee: CAPITALBIO TECHNOLOGY (CHENGDU) CO., LTD., Chengdu (CN)

(*) Notice: Subject to any disclaimer, the term of this patent is extended or adjusted under 35 U.S.C. 154(b) by 835 days.

(21) Appl. No.: 16/949,344

(22) Filed: Oct. 26, 2020

(65) Prior Publication Data

US 2021/0276010 A1     Sep. 9, 2021

(30) Foreign Application Priority Data

Mar. 6, 2020 (CN) .......................... 202010150495.1

(51) Int. Cl.
| | | |
|---|---|---|
| *B01L 3/00* | (2006.01) | |
| *B01L 9/00* | (2006.01) | |
| *C12M 1/00* | (2006.01) | |
| *C12Q 1/6844* | (2018.01) | |
| *G01N 15/14* | (2006.01) | |

(52) U.S. Cl.
CPC .......... *B01L 3/502715* (2013.01); *B01L 9/56* (2019.08); *G01N 15/1484* (2013.01); *B01L 2200/025* (2013.01); *B01L 2300/0803* (2013.01)

(58) Field of Classification Search
CPC ................ B01L 3/502715; B01L 9/56; B01L 2200/025; B01L 2300/0803; B01L 3/5027; B01L 2200/027; B01L 2200/10; B01L 15/148; G01N 15/1484; G01N 21/6452; G01N 2201/0415; G01D 5/3473; C12Q 1/6844

See application file for complete search history.

(56) References Cited

U.S. PATENT DOCUMENTS

| | | | |
|---|---|---|---|
| 2005/0185569 A1* | 8/2005 | Coombs ........... | G01N 35/00069 369/275.3 |
| 2016/0255274 A1* | 9/2016 | Tao ........................ | G01D 5/366 348/208.1 |

* cited by examiner

*Primary Examiner* — Jill A Warden
*Assistant Examiner* — Michael Stanley Gzybowski
(74) *Attorney, Agent, or Firm* — MASCHOFF BRENNAN (57) ABSTRACT

An optical positioning code disk, device and method for a microfluidic chip are provided. A cross section of an outer contour of the code disk is circular. N light transmissive openings are arranged uniformly around the code disk. The device includes: the code disk, a positioning pin, a rotating shaft, a motor, an internal photoelectric switch and an external photoelectric switch. A positioning surface is provided on the rotating shaft. The motor is fixedly connected with an end of the rotating shaft, and the other end of the rotating shaft passes through a center of the cross section of the code disk. The internal and external photoelectric switches are configured to identify the light transmissive openings on the code disk.

8 Claims, 6 Drawing Sheets

OPTICAL POSITIONING CODE DISK, DEVICE AND METHOD FOR MICROFLUIDIC CHIP

The present application claims priority to Chinese Patent Application No. 202010150495.1, titled "OPTICAL POSITIONING CODE DISK, DEVICE AND METHOD FOR MICROFLUIDIC CHIP", filed on Mar. 6, 2020 with the China National Intellectual Property Administration, which is incorporated herein by reference in its entirety.

FIELD

The present disclosure relates to the technical field of microfluidic chip positioning, and in particular to an optical positioning code disk for a microfluidic chip, an optical positioning device for a microfluidic chip and an optical positioning method for performing an optical positioning on a microfluidic chip.

BACKGROUND

Nucleic acid analysis is widely used in life science, medicine, food safety, environmental monitoring and other fields. A microfluidic chip detection technology is usually used. In the microfluidic chip detection technology, discontinuous processes such as sample preparation, biochemical reaction, analysis and detection are integrated into one microfluidic chip, thereby realizing the whole miniaturization, automation, integration and portability from sample reaction to result detection. A key factor in nucleic acid analysis is how to correctly and effectively collect fluorescence signal data during nucleic acid amplification.

Figure 1:
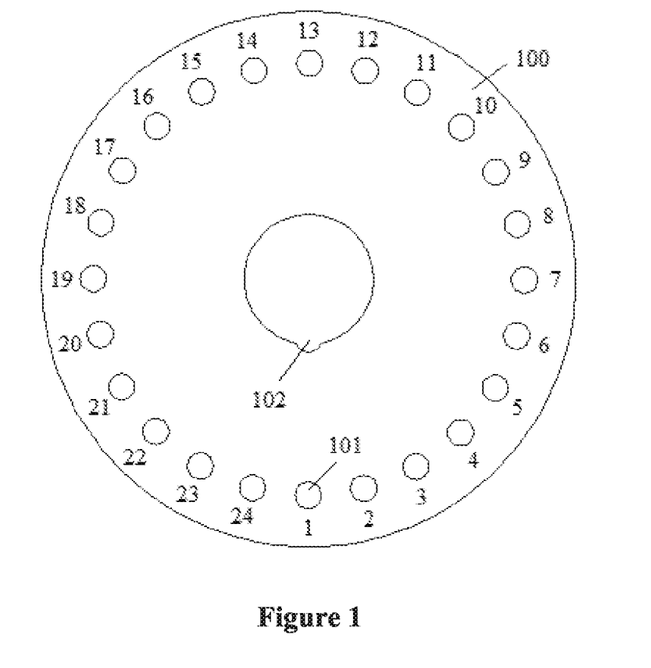
FIG. 1 is a schematic structural view of a microfluidic chip.
Figure 2:
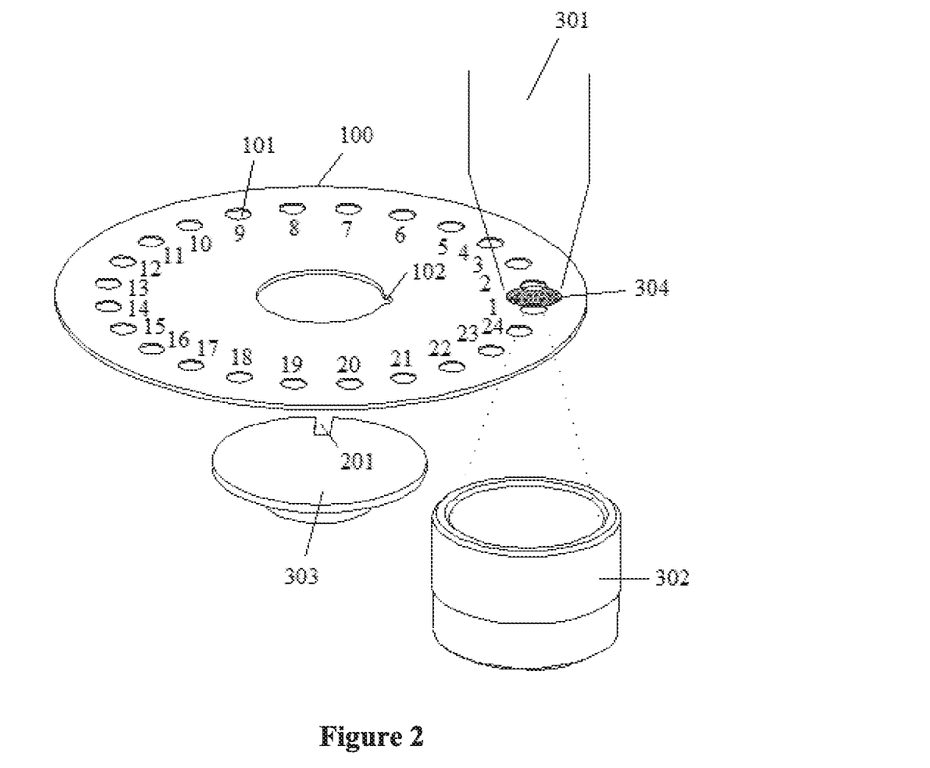
FIG. 2 is a schematic view showing conventional continuous collection and positioning on a microfluidic chip.

As shown in FIG. 1, a microfluidic chip includes N (N=24 in common microfluidic chips) reaction tanks. Each reaction tank is numbered with a corresponding number, and a positioning gap in an inner ring of the microfluidic chip corresponds to a first reaction tank. The collected fluorescence data needs to be corresponding to the reaction tank. As shown in FIG. 2, in a conventional method, a light shielding piece with a rectangular light transmissive opening is used, and positioning is performed by using the light transmissive opening. A light spot is located between the first reaction tank and a 24-th reaction tank at an initial position of the rotation. That is, the detection is performed successively from the first reaction tank to the 24-th reaction tank.

The conventional method requires a high stability on a rotation speed of a stepper motor, because change of the rotation speed of the motor will affect data distribution and cause the offset of a required measurement point, which will affect an accuracy of the fluorescence data.

SUMMARY

An optical positioning code disk, an optical positioning device and an optical positioning method for a microfluidic chip are provided according to the disclosure.

An optical positioning code disk for a microfluidic chip is provided in this disclosure. A cross section of an outer contour of the code disk is circular. N light transmissive openings are arranged uniformly around the code disk. A length of a first light transmissive opening is greater than a length of each of a second light transmissive opening to a N-th light transmissive opening. The first light transmissive opening corresponds to a first reaction tank of the microfluidic chip. The second light transmissive opening to the N-th light transmissive opening correspond to a second reaction tank to a N-th reaction tank of the microfluidic chip respectively.

In an embodiment, a width of the light transmissive opening is calculated by the following formula: $L \leq d_1 * d_2 / d_3$, where $d_1$ represents a diameter of the reaction tank of the microfluidic chip; $d_2$ represents a diameter of the code disk; $d_3$ represents a diameter of a circular arc of the reaction tank on the microfluidic chip and with a same circle center as the microfluidic chip.

An optical positioning device for a microfluidic chip is provided in this disclosure. The optical positioning device includes: the code disk, a positioning pin, a rotating shaft, a motor, an internal photoelectric switch and an external photoelectric switch. A positioning surface is provided on the rotating shaft. The motor is fixedly connected with an end of the rotating shaft, and the other end of the rotating shaft passes through a center of the cross section of the code disk. Positioning is performed by providing the positioning pin at a positioning gap of the microfluidic chip to cooperate with the positioning surface. The internal photoelectric switch and the external photoelectric switch are configured to identify the light transmissive openings on the code disk.

In an embodiment, the code disk is integrally formed with the rotating shaft.

It is also provided an optical positioning method for performing an optical positioning on a microfluidic chip by using the optical positioning device. The method includes: step 1, making the light transmissive openings of the code disk be corresponding to the reaction tanks of the microfluidic chip respectively based on an angle relationship between the positioning surface on the rotating shaft and the positioning pin; step 2, mounting the internal photoelectric switch and the external photoelectric switch, to make the internal photoelectric switch be able to identify the first light transmissive opening corresponding to the first reaction tank, and to make the external photoelectric switch be able to identify the second light transmissive opening to the N-th light transmissive opening corresponding to the second reaction tank to the N-th reaction tank respectively; step 3, starting the motor, to make the code disk and the microfluidic chip rotate synchronously, and performing data collection.

In an embodiment, the performing data collection in step 3 includes: generating a rising edge and a falling edge when the internal photoelectric switch or the external photoelectric switch detects the light transmissive opening of the code disk; starting from the first reaction tank, starting collecting a piece of data when the rising edge of the light transmissive opening corresponding to the reaction tank comes and stopping collecting the piece of data when the falling edge of the light transmissive opening corresponding to the reaction tank comes.

In an embodiment, processing the collected pieces of data includes: removing a part of data accounting for a threshold value of each piece of data from a front end and a back end of the piece of data, taking a median value from remaining data of the piece of data, to obtain the median values A1, A2, . . . , A24 of the 24 reaction tanks as valid data of the 24 reaction tanks at a current time instant.

In an embodiment, pieces of data of a same reaction tank collected at different time instants are sorted in a chronological order to form an amplification curve.

In summary, since the above technical solution is adopted, the present disclosure has the following beneficial effects.

1. The present disclosure adopts optical identification to position the microfluidic chip, thereby reducing the requirement for the stability on a rotation speed of the motor, so that the measurement data is more accurate and reliable.

2. The mounting and debugging of the motor is convenient and simple, which can shorten the assembly and debugging time and save a labor cost.

BRIEF DESCRIPTION OF THE DRAWINGS

To illustrate technical solutions in the embodiments of the present disclosure more clearly, the drawings to be used in the description of the embodiments are described briefly hereinafter. It should be understood that the drawings described hereinafter show only some embodiments of the present disclosure, and are not intended to limit the present disclosure, for those skilled in the art, other associated drawings may be obtained according to these drawings without any creative effort.

Reference numerals are listed as follows.

| |
|---|
| 100 microfluidic chip, |
| 101 reaction tank, |
| 102 positioning gap, |
| 200 code disk, |
| 201 light transmissive opening, |
| 301 excitation light path, |
| 302 objective lens of a receiving light path system, |
| 303 light shielding piece, |
| 304 light spot, |
| 400 rotating shaft, |
| 401 positioning surface, |
| 500 positioning pin, |
| 600 motor, |
| 701 internal photoelectric switch, |
| 702 external photoelectric switch. |

DETAILED DESCRIPTION OF THE EMBODIMENTS

To make the objects, solutions and advantages of the present disclosure more clear and apparent, the present disclosure is described in detail in conjunction with the drawings and embodiments. It should be understood that the specific embodiments described herein are used only to explain the present disclosure and are not intended to limit the present disclosure, that is, the described embodiments are only a few rather than all of the embodiments of the present disclosure. The components of the embodiments of the present disclosure, which are generally described and illustrated in drawings herein, may be arranged and designed in various different configurations. Therefore, the following detailed description of the embodiments of the present disclosure provided in drawings are not intended to limit the protection scope of the present disclosure, but merely represents the selected embodiments of the present disclosure. All other embodiments obtained by those skilled in the art without any creative work based on the embodiments of the present disclosure fall within the protection scope of the present disclosure.

Figure 3:
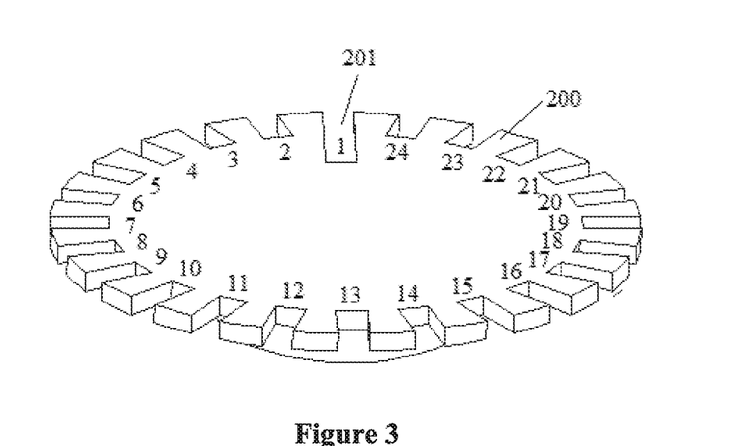
FIG. 3 is a schematic structural view of an optical positioning code disk for a microfluidic chip according to the present disclosure.
Figure 4:
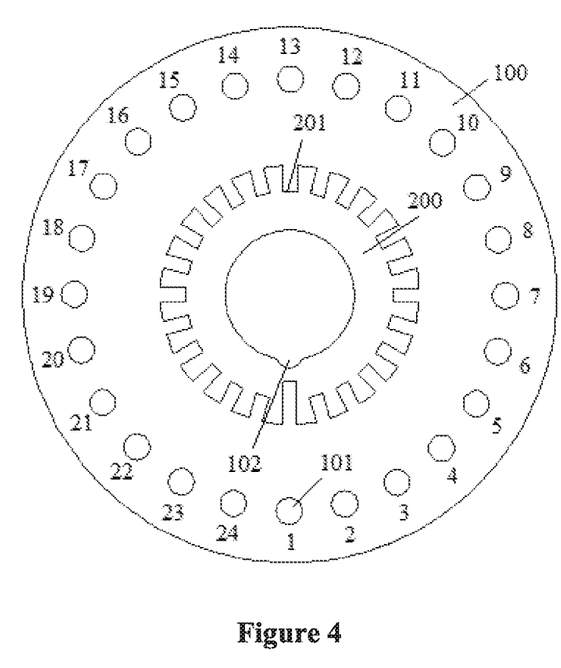
FIG. 4 is a view showing a corresponding relationship between light transmissive openings on a code disk and reaction tanks of a microfluidic chip according to the present disclosure.

The present disclosure takes N=24, that is, a microfluidic chip having 24 reaction tanks as an example for description. As shown in FIGS. 3 and 4, an optical positioning code disk 200 for a microfluidic chip is provided. A cross section of an outer contour of the code disk 200 is circular. 24 light transmissive openings 201 are arranged uniformly around the code disk. A length of a first light transmissive opening is greater than a length of each of a second light transmissive opening to a N-th light transmissive opening. The first light transmissive opening corresponds to a first reaction tank of the microfluidic chip 100. The second light transmissive opening to the 24-th light transmissive opening correspond to a second reaction tank to a 24-th reaction tank of the microfluidic chip 100 respectively.

In an embodiment, a width of the light transmissive opening 201 is calculated by the following formula: $L \leq d_1 * d_2 / d_3$, where $d_1$ represents a diameter of the reaction tank 101 of the microfluidic chip 100; $d_2$ represents a diameter of the code disk; $d_3$ represents a diameter of a circular arc of the reaction tank 101 on the microfluidic chip 100 and with a same circle center as the microfluidic chip 100. In the common microfluidic chip 100, the diameter $d_1$ of the reaction tank 101 is 3 mm; the diameter $d_3$ of the circular arc of the reaction tank 101 on the microfluidic chip 100 and with a same circle center as the microfluidic chip 100 is 50 mm. Assuming that the diameter $d_2$ of the code disk is 30 mm, in this case, the width of the light transmissive opening 201 is L=3*30/50=1.8 mm, thus, the detection data can cover the whole reaction tank 101 with L=1.8 mm.

Figure 5:
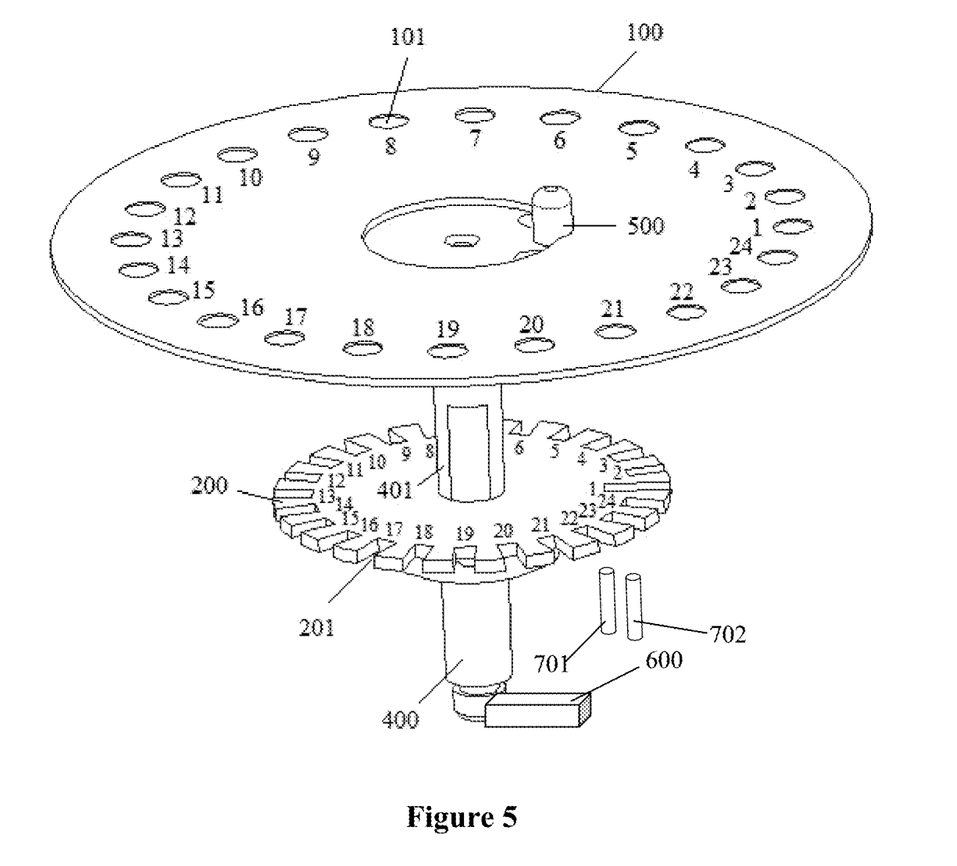
FIG. 5 is a schematic structural view of an optical positioning device for a microfluidic chip according to the present disclosure.
Figure 6:
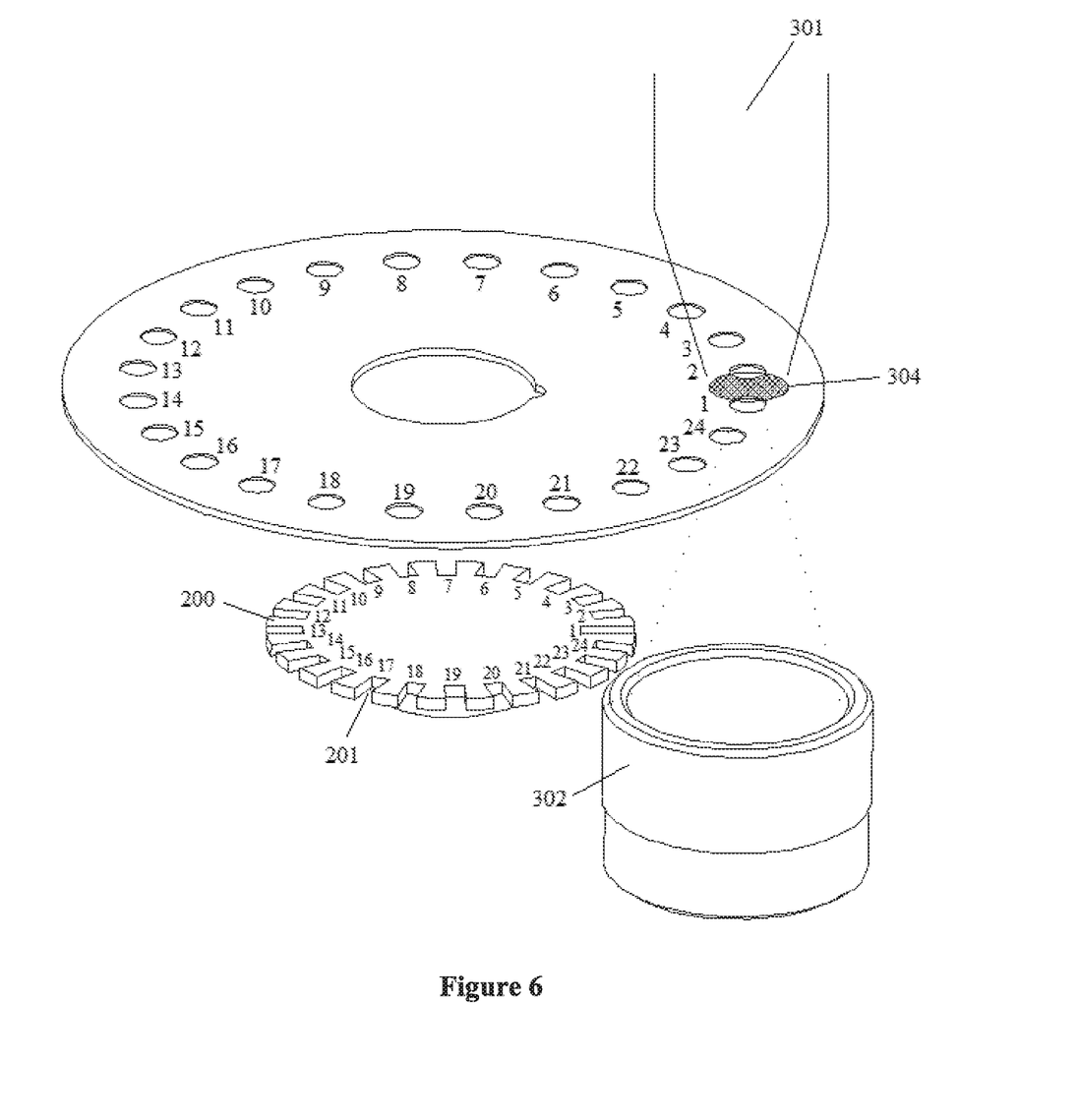
FIG. 6 is a schematic view showing continuous collection and positioning on a microfluidic chip by using the code disk according to the present disclosure.

As shown in FIGS. 5 and 6, an optical positioning device for a microfluidic chip is provided. The optical positioning device includes the code disk 200, a positioning pin 500, a rotating shaft 400, a motor, an internal photoelectric switch and an external photoelectric switch. A positioning surface 401 is provided on the rotating shaft 400. The motor is fixedly connected with an end of the rotating shaft 400, and the other end of the rotating shaft 400 passes through a center of the cross section of the code disk 200. Positioning is performed by providing the positioning pin 500 at a positioning gap 102 of the microfluidic chip 100 to cooperate with the positioning surface 401. The internal photoelectric switch and the external photoelectric switch are configured to identify the light transmissive openings 201 on the code disk 200.

In an embodiment, the code disk 200 is integrally formed with the rotating shaft 400.

In an embodiment, it is provided an optical positioning method for performing an optical positioning on a microfluidic chip 100 by using the optical positioning device. The optical positioning method includes following steps 1-3.

Step 1, make the light transmissive openings 201 of the code disk 200 be corresponding to the reaction tanks 101 of the microfluidic chip 100 respectively based on an angle relationship between the positioning surface 401 on the rotating shaft 400 and the positioning pin 500. It should be noted that, the code disk 200 is parallel to the cross section of the microfluidic chip 100.

Step 2, mount the internal photoelectric switch and the external photoelectric switch, to make the internal photoelectric switch be able to identify the first light transmissive opening corresponding to the first reaction tank, and to make the external photoelectric switch be able to identify the second light transmissive opening to the 24-th light transmissive opening corresponding to the second reaction tank to the 24-th reaction tank respectively.

Step 3, start the motor, to make the code disk 200 and the microfluidic chip 100 rotate synchronously, and perform data collection.

Figure 7:
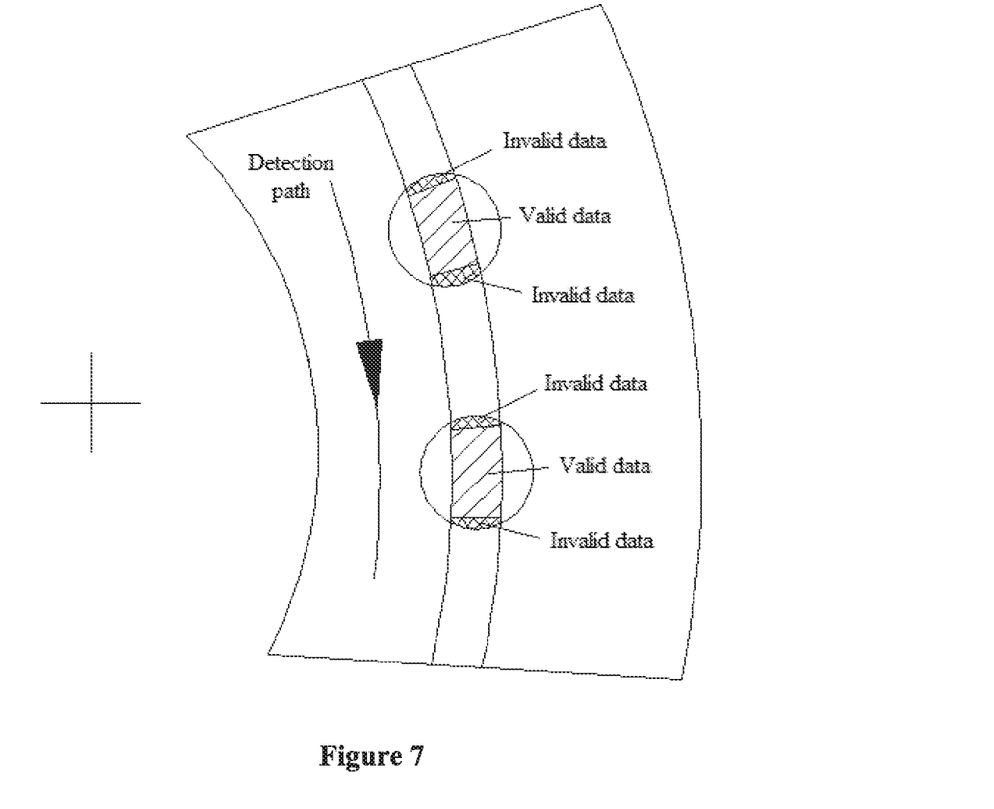
FIG. 7 is a schematic view showing the data collection performed by using an optical positioning method for a microfluidic chip according to the present disclosure.

In an embodiment, as shown in FIG. 7, the performing data collection in step 3 includes: generating a rising edge and a falling edge when the internal photoelectric switch or the external photoelectric switch detects the light transmissive opening 201 of the code disk 200 (that is, the rising edge is generated when the code disk enters the position of the light transmissive opening from the non-light-transmissive opening, and the falling edge is generated when the code disk enters the position of the non-light-transmissive opening from the light transmissive opening); starting from the first reaction tank, starting collecting a piece of data when the rising edge of the light transmissive opening 201 corresponding to the reaction tank 101 comes and stopping collecting the piece of data when the falling edge of the light transmissive opening 201 corresponding to the reaction tank 101 comes.

In an embodiment, processing the collected pieces of data includes: removing a part of data accounting for a threshold value (the threshold value may be 5%, 10%, or other values according to actual needs) of each piece of data from a front end and a back end of the piece of data, taking a median value from remaining data of the piece of data, to obtain the median values A1, A2, . . . , A24 of the 24 reaction tanks 101 as valid data of the 24 reaction tanks 101 at a current time instant.

In an embodiment, pieces of data of a same reaction tank 101 collected at different time instants are sorted in a chronological order to form an amplification curve.

The above are only preferred embodiments of the present disclosure and are not intended to limit the present disclosure, and any modifications, equivalent substitutions and improvements within the spirit and the principle of the present disclosure are included within the protection scope of the present disclosure.

The invention claimed is:

1. An optical positioning code disk for a microfluidic chip, wherein:
a cross section of an outer contour of the code disk is circular,
N light transmissive openings are arranged uniformly around the code disk and include a first light transmissive opening, wherein along a radial direction of the code disk, a length of the first light transmissive opening is greater than a length of each of the N transmissive openings other than the first light transmissive opening,
the first light transmissive opening corresponds to a first reaction tank among N reaction tanks of a microfluidic chip, and
the other N light transmissive openings correspond to the other N reaction tanks, respectively.

2. The optical positioning code disk according to claim 1, wherein a width of each of the N light transmissive openings is calculated by the following formula:

$$L \leq d_1 * d_2 / d_3$$

where L represents the width of each of the N light transmissive openings, $d_1$ represents a diameter of each of the N reaction tanks of the microfluidic chip; $d_2$ represents a diameter of the code disk; $d_3$ represents a diameter of a circular arc of the reaction tank on the microfluidic chip and with a same circle center as the microfluidic chip.

3. An optical positioning device for a microfluidic chip, comprising:
a code disk, a positioning pin, a rotating shaft, a motor, an internal photoelectric switch and an external photoelectric switch; wherein a positioning surface is provided on the rotating shaft;
wherein a cross section of an outer contour of the code disk is circular, and N light transmissive openings are arranged uniformly around the code disk and include a first light transmissive opening, wherein a length of the first light transmissive opening is greater than a length of each of the other N light transmissive openings, the first light transmissive opening corresponds to a first reaction tank among N reaction tanks of a microfluidic the microfluidic chip, and the other N light transmissive openings correspond to the other N reaction tanks, respectively; wherein
the motor is fixedly connected with an end of the rotating shaft, and another end of the rotating shaft passes through a center of the cross section of the code disk; wherein the N transmissive openings are capable to be positioned in alignment with the N reaction tanks, respectively, according to an angular relationship between the positioning surface and the positioning pin fixed at a positioning gap of the microfluidic chip; the internal photoelectric switch and the external photoelectric switch are configured to identify the light transmissive openings on the code disk.

4. The optical positioning device according to claim 3, wherein the code disk is integrally formed with the rotating shaft.

5. An optical positioning method for performing an optical positioning on a microfluidic chip by using an optical positioning device, wherein the optical positioning device comprises:
a code disk, a positioning pin, a rotating shaft, a motor, an internal photoelectric switch and an external photoelectric switch; wherein a positioning surface is provided on the rotating shaft; wherein a cross section of an outer contour of the code disk is circular, and N light transmissive openings are arranged uniformly around the code disk and includes a first light transmissive opening, wherein a length of the first light transmissive opening is greater than a length of each of the other N light transmissive openings, the first light transmissive opening corresponds to a first reaction tank among N reaction tanks of the microfluidic chip, and the other N light transmissive openings correspond to the other N reaction tanks; wherein
the motor is fixedly connected with an end of the rotating shaft, and another end of the rotating shaft passes through a center of the cross section of the code disk; the internal photoelectric switch and the external photoelectric switch are configured to identify the light transmissive openings on the code disk;

wherein the optical positioning method comprising:

a) positioning the N light transmissive openings of the code disk in alignment with the N reaction tanks, respectively, based on an angular relationship between the positioning surface and the positioning pin fixed at a positioning gap in the center of the microfluidic chip;

using the internal photoelectric switch to identify the first light transmissive opening, and using the external photoelectric switch to identify the other N light transmissive openings; and c) starting the motor, to make the code disk and the microfluidic chip rotate synchronously, and performing data collection.

6. The optical positioning method according to claim 5, wherein the performing data collection in step c) comprises:

generating, by the internal photoelectric switch and the external photoelectric switch, a rising edge and a falling edge of light transmitted through any of the N light transmissive openings;

starting collecting data in response to the rising edge and stopping collecting data in response to the falling edge of light transmitted through any of the N light transmissive openings.

7. The optical positioning method according to claim 6, further comprising:

discarding a part of data from a front end and a back end of the data, which is less than a threshold value;

taking a median value from remaining data, wherein the median value serves as valid data for a corresponding one of the N reaction tanks.

8. The optical positioning method according to claim 7, wherein pieces of data associated with the same reaction tank, collected at different times are sorted in a chronological order to form an amplification curve.

* * * * *